Sept. 12, 1933.  F. C. ARMBRUSTER  1,926,422
PIPE JOINT
Filed Dec. 29, 1930  3 Sheets-Sheet 1
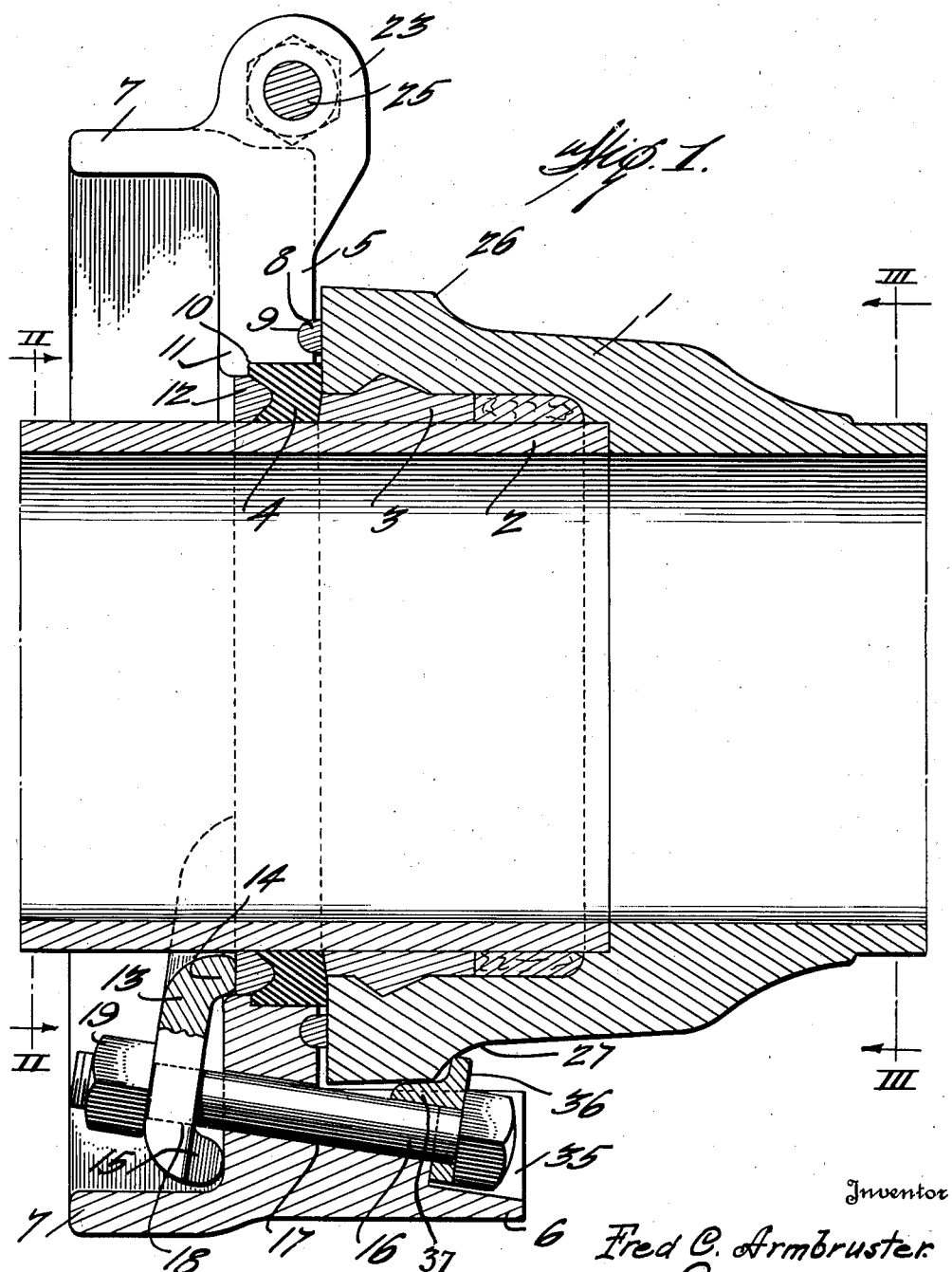

Sept. 12, 1933.  F. C. ARMBRUSTER  1,926,422
PIPE JOINT
Filed Dec. 29, 1930   3 Sheets-Sheet 2
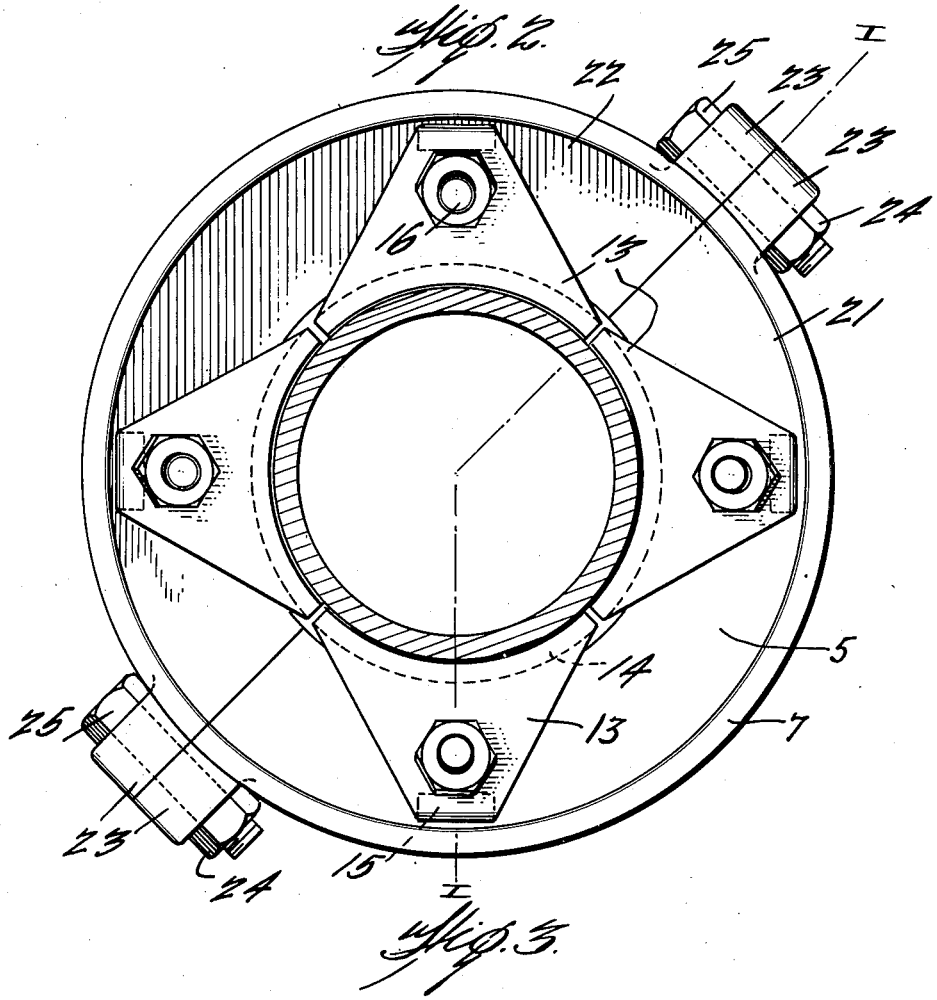
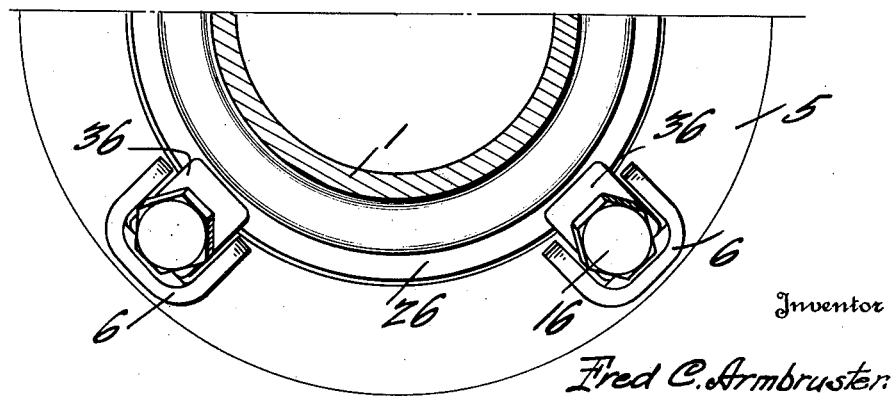
Inventor
Fred C. Armbruster
By
Attorney Sept. 12, 1933.  F. C. ARMBRUSTER  1,926,422
PIPE JOINT
Filed Dec. 29, 1930  3 Sheets-Sheet 3
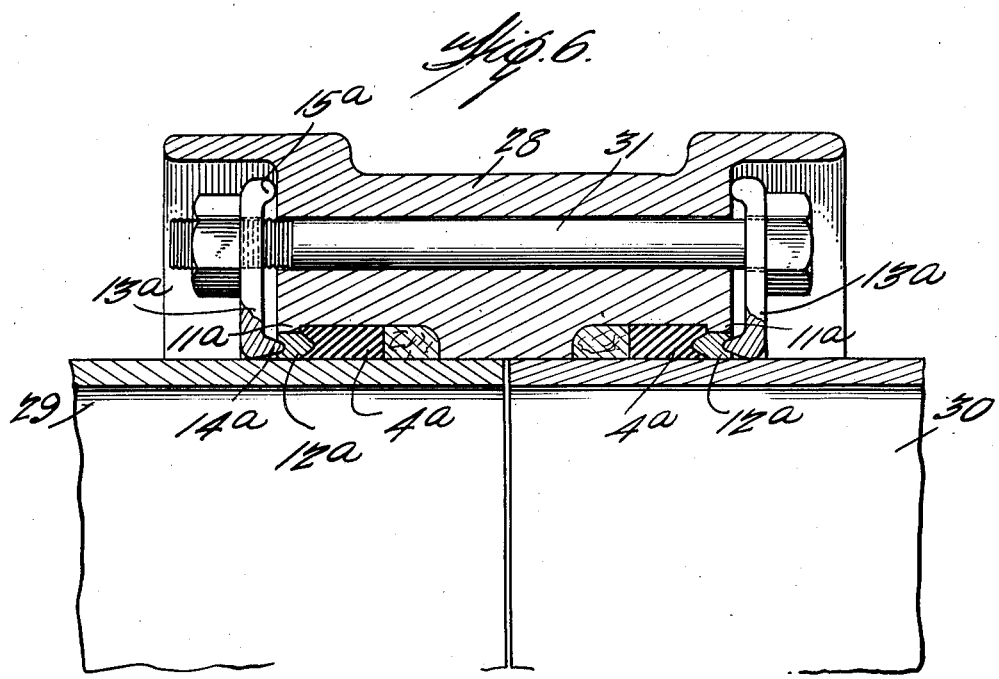
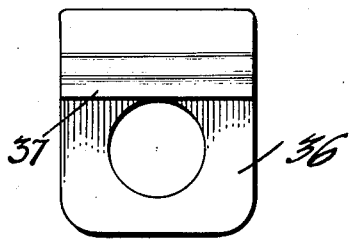
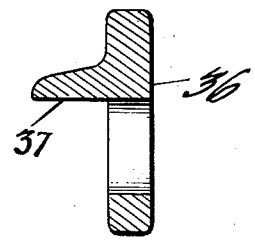
Inventor
Fred C. Armbruster.
By
Attorney Patented Sept. 12, 1933

1,926,422

UNITED STATES PATENT OFFICE 1,926,422

PIPE JOINT

Fred C. Armbruster, Rochester, N. Y.

Application December 29, 1930
Serial No. 505,447

16 Claims. (Cl. 285—136)

My invention relates to pipe joints and particularly to means for repairing or sealing leaky joints in old pipe lines.

In general terms, the object of my invention is to provide an improved arrangement of this character which is more effective for the intended purpose than the devices which have been proposed heretofore.

Another object of my invention is to provide an effective seal for a leaky pipe joint embodying a sealing member of rubber or the like and means for preventing extrusion of the rubber from the seal or the exposure of the same to the atmosphere.

A further object of my invention is to provide a device for repairing pipe joints which is particularly applicable to the bell and spigot type of joint, which is easily applied in the field and which is adapted to accommodate the usual variations in the dimensions and configurations of the bells of pipe joints which are encountered in actual practice.

A still further object is to provide a repair device which meets the problems of leakage incident to a pipe line for natural gas and other hydrocarbon fluids.

In using pipe lines previously employed for carrying manufactured gas at low pressure for natural gas at substantial pressures, it is found that many of the joints leak after a comparatively short time. It is believed that the rubber gaskets deteriorate because of the dryness of the natural gas, and a similar effect is caused by crude oil and other liquid hydrocarbons. Apparently the rubber becomes softened and tends to flow out of the joint. By the use of the present invention, this problem is overcome in a simple and effective manner, and a seal is provided in which the sealing member of rubber or the like is completely confined so that if it is softened by the fluid in the pipe, it cannot flow out of the joint.

Other detailed objects and advantages of my invention will appear as the description proceeds.

In the accompanying drawings, preferred embodiments of my invention are illustrated.

Fig. 1 is a longitudinal sectional view through a joint constructed in accordance with the invention taken on the line 1—1 of Fig. 2;

Fig. 2 is a cross sectional view taken on line 2—2 of Fig. 1;

Fig. 3 is a fragmentary cross section through line 3—3 of Fig. 1;

Figs. 4 and 5 are detailed views of the washer shown in Figs. 1 to 3; and

Fig. 6 is a fragmentary cross sectional view of a modified form of joint.

Referring to these drawings, and particularly to Figs. 1 to 3, one type of joint to which the invention is applied is the well known bell and spigot joint represented by the bell 1, spigot 2 and the usual joint filler 3. The gasket to be applied at the joint is shown at 4 and is usually of rubber or rubber-like composition. This gasket 4, generally of strip form, is placed around the spigot at the joint and is held against the spigot 2 by a split ring 5 having lugs 6 and a circumferential flange 7 at its outer periphery. A packing ring 8 in an annular recess 9 adjacent the inner periphery of ring 5 serves as a seal between the end of the bell 1 and the ring 5. An annular cut-out portion 10 of the ring 5 is provided for the reception of the gasket 4. Between the projecting edge 11 of the ring 5 and the spigot 2 is placed a wedge-shaped packing ring 12. The packing rings 8 and 12 are generally of lead, but other suitable materials may be used.

A plurality of clamping pieces or plates 13 are arranged on the outer face of the ring 5. These plates 13 have flanges 14 and 15 at their inner and outer ends, respectively. The flanges 15 bear against ring 5. The flanges 14 are arcuate and form a substantially continuous ring around the spigot 2 adapted to pass between the ring 5 and the spigot 2 and bear on the packing ring 12. Recesses 35 are formed in the lugs 6 so as to provide seats for washers 36, shown in detail in Figs. 4 and 5.

Adjacent the lower edge of the washer 36 there is formed a wedge 37. Bolts 16 extend through the washers and aligned holes 17 and 18 in the split ring 5 and clamping plates 13. Nuts 19 are provided for the ends of bolts 16. The sections 21 and 22 of split ring 5 are secured together by means of ears 23 formed on the sections 21, 22 and nuts 24 and bolts 25.

In assembling this device, suitable lengths of rubber pieces 4, and lead pieces 8 and 12 are cut from strips of the same material. The ends of these strips may be cut on a bias to overlap when mounted in position. The rubber gasket 4 is laid around spigot 2 at the joint. The sections 21 and 22 of ring 5 are placed around the pipe 2 and bolted together. The packing ring 8 is placed in recess 9 and the ring 5 is moved up to the end of bell 1, the rubber gasket 4 being forced into the cut-out portion 10 and against the pipe 2. The packing ring 12 is then placed around the pipe 2. The clamping plates 13 are then assembled on the face of ring 5 and around pipe 2 with the inner flanges 14 resting against packing ring 12. Washers 36 are placed on bolts 16 and the latter are passed through the aligned apertures 17 and 18 in the ring 5 and plates 13. The nuts 19 are threaded onto the bolts 16 and tightened.

As the nuts 19 are tightened, the flanges 14 force the packing ring 12 between projection 11 and pipe 2 and force the wedge-shaped end of packing ring 12 into the rubber gasket 4, putting the latter under compression, and forcing it against ring 5, spigot 2, and joint 3 to completely fill the chamber formed by the end of bell 1, spigot 2, ring 5, and packing ring 12. During this tightening of the bolts 16, the washers 36 are forced against the shoulder 26 of the bell until the washers find a proper seat. In some cases, where the shoulder on the bell is formed so as to permit it the lower edge 27 of the washer will abut on the shoulder and the wedge 37 will serve to prevent the washer from slipping away from recess 35, thereby insuring the positioning of the washer and in turn the proper positioning and seating of ring 5. In some cases where the bell is of irregular shape, the washer 36 will find a proper seating on the bell merely through the contacting of wedge 37 with the surface of the bell. The wedge in this case insures that the washer will properly seat in recess 35 to maintain ring 5 in proper position.

The flange 7 is made of such a length that when the device is assembled at the leaky joint it will extend to the ends of the bolts 16 and serve to protect the bolt ends. In some instances, it is found desirable to add a further protection to the threaded ends of the bolts 19 bearing the nuts. This may be accomplished by filling in the space around the nut end of the bolt and between flange 7 and pipe 2 with cement. This arrangement will prevent rusting of the threads of the nut and bolt and facilitate a subsequent removal of the repair device at any time.

It should also be noted that the axes of the bolts 16 are slightly inclined to the axis of the pipe. By this arrangement, the structure is made more compact and it is found that the desired wedging and clamping action of the clamping plates 13 is secured.

By using a split form of ring 5 and a plurality of clamping plates 13, a repair device is provided which may be quickly and easily assembled in the field to repair leaks in old pipe lines. The ring 5 is shown in two parts and four clamping plates 13 are shown, but any other suitable number may be employed without departing from the scope of my invention.

In Fig. 6 is shown a modification of the invention as embodied in a coupling for the joints, for example, in plain end cast iron pipe. The coupling shown comprises only three elements besides the packing and bolts, namely a center ring 28 encircling the joint between pipes 29 and 30 and clamping segments 13a at each end of the coupling which are similar in shape and in function to the segments 13 in the first modification. The segments 13a are held in position by bolts 31 and are provided with flanges 14a bearing upon the wedge-shaped packing rings 12a to completely confine the rubber gasket or packing 4a whereby an effective and permanent seal is secured.

In the specification and claims, the expression telescoping pipe joints is intended to cover and include either the bell and spigot joint or the sleeve joint, as well as any other joint to which the repair device is applicable.

It is obvious from the above description that a joint has been provided in accordance with the present invention which puts the sealing gasket of rubber or the like under compression at the joint, completely seals the gasket from the atmosphere and prevents any extrusion of rubber from the joint. By providing a seal of this character, a tight joint is obtained and deterioration of the rubber by the atmosphere is substantially prevented. As indicated, the invention is applicable to ordinary joints but it is of particular utility in connection wth the repairing of leaky joints already provided with a coupling or seal.

This invention also provides as is apparent from the description a repair device which is easily applied in the field, and which is adapted to allow for the usual variations in the dimensions and configurations of the outer pipe, or the bell of the joint as the case may be. Various constructional modifications in detail can obviously be made in the arrangements set forth without departing from the scope of the invention.

I claim:

1. A repair device for applying a gasket to a telescoping pipe joint comprising a ring for holding the gasket against the inner pipe at the joint and having an annular recess adjacent its inner periphery and facing the end of the outer pipe for receiving a packing ring, a packing ring in said recess, a second packing ring having a tight fit between said holding ring and the inner pipe and adapted to engage said gasket, clamping pieces for forcing said second packing ring against said gasket and means for clamping said holding ring and said clamping pieces to the outer pipe.

2. A repair device for applying a gasket to a bell and spigot joint comprising a ring for holding the gasket against the spigot at the joint and having an annular recess adjacent its inner periphery and facing the end of the bell for receiving a packing ring, a packing ring in said recess, a second packing ring adapted to be forced between said holding ring and the spigot and against said gasket, clamping pieces for engaging said second packing ring and forcing the latter against said gasket and means for clamping said holding ring and said clamping pieces to the bell.

3. A repair device for applying a gasket to a telescoping pipe joint comprising a ring for holding the gasket against the inner pipe at the joint, a packing ring between said holding ring and the end of the outer pipe and adjacent the inner periphery of said holding ring, a second packing ring filling the space between said holding ring and the inner pipe, said second ring being spaced from the pipe joint and adapted to force said gasket against the joint, clamping pieces engaging the entire periphery of said second packing ring and means for securing said holding ring and said clamping pieces to the outer pipe.

4. A repair device for applying a gasket to a telescoping pipe joint comprising a ring for holding the gasket against the inner pipe at the joint and having an annular recess adjacent its inner periphery and facing the end of the outer pipe for receiving a packing ring, a packing ring in said recess, a second packing ring filling the space between said holding ring and the inner pipe and adapted to force said gasket against the joint, clamping pieces for forcing said second packing ring against said gasket, and means for securing said holding ring and said clamping pieces to the outer pipe.

5. A repair device for applying a gasket to a telescoping pipe joint comprising a ring encircling the gasket, a packing ring between said first-mentioned ring and the end of the outer pipe and adjacent the inner periphery of said first-mentioned ring, a second packing ring of wedge shape and filling the space between said first-mentioned ring and the inner pipe and adapted to force said gasket against said first-mentioned ring, the inner pipe and the joint, clamping pieces for forcing said second packing ring against and into said gasket and means for securing said clamping pieces to the outer pipe.

6. A repair device for applying a gasket to a telescoping pipe joint comprising a ring for holding the gasket against the inner pipe at the joint, a wedge-shaped packing ring fitting the space between said holding ring and the inner pipe removed from the pipe joint and adapted to force said gasket against said holding ring, the inner pipe and the joint, clamping pieces for forcing said packing ring against and into said gasket and means for securing said holding ring and said clamping pieces to the outer pipe.

7. A repair device for applying a gasket to a telescoping pipe joint comprising a ring for holding said gasket at the joint and against the inner pipe and in contact with the outer pipe, clamping plates resting on the outer face of said holding ring and having arcuate flanges on their inner ends forming a substantially continuous ring adapted to pass between said holding ring and the inner pipe to press said gasket against the joint and means for drawing said holding ring and said clamping plates toward the end of the outer pipe and securing same in place.

8. A repair device for applying a gasket to a telescoping pipe joint comprising a multi-apertured ring for holding the gasket against the inner pipe at the joint, a packing ring between the inner face of said holding ring and the end of the outer pipe, a second packing ring filling the space between said holding ring and the inner pipe removed from the pipe joint and adapted to force said gasket against the joint, a plurality of apertured clamping plates arranged on the outer face of said holding ring and having arcuate flanges at their inner ends forming substantially a continuous ring surrounding the inner pipe adapted to bear on said second packing ring, washers engaging a shoulder on the outer pipe and bolts passing through aligned holes in said washers, holding ring and clamping plates.

9. A repair device for applying a gasket to a telescoping pipe joint comprising a multi-apertured ring for holding the gasket against the inner pipe at the joint, a packing ring filling the space between said holding ring and the inner pipe removed from the pipe joint and adapted to force said gasket against the joint, a plurality of apertured clamping plates arranged on the face of said holding ring and having arcuate flanges at their inner ends forming substantially a continuous ring surrounding the inner pipe adapted to bear on said packing ring, washers engaging a shoulder on the outer pipe and bolts passing through aligned holes in said washers, holding ring and clamping plates.

10. A repair device for applying a gasket to a telescoping pipe joint comprising a multi-apertured flange for holding the gasket against the inner pipe, a packing ring filling the space between said holding ring and the inner pipe removed from the pipe joint and adapted to force said gasket against the joint, a plurality of apertured clamping plates arranged on the face of said holding ring and having flanges on their inner and outer ends, said outer flanges bearing upon said holding ring, said inner flanges being arcuate and forming a substantially continuous ring surrounding the inner pipe adapted to bear on said packing ring, washers engaging a shoulder on the outer pipe and bolts passing through aligned holes in said washers, holding ring and clamping plates.

11. A repair device for applying a gasket to a telescoping pipe joint comprising a multi-apertured ring for holding said gasket against the inner pipe, a plurality of clamping plates arranged on the face of said holding ring and having flanges on their inner and outer ends, said outer flanges bearing on said holding ring, said inner flanges being arcuate and forming substantially a continuous ring surrounding the inner pipe adapted to pass between said holding ring and inner pipe to press said gasket against the joint, said clamping plates having apertures intermediate said flanges and in alignment with the apertures in said holding ring, said holding ring having recesses on its side facing the outer pipe for providing seats for washers, washers arranged in said recesses and having their inner ends abutting on a shoulder on the outer pipe and bolts extending through said washers and the aligned apertures in said holding ring and clamping plates.

12. A repair device for applying a gasket to a telescoping pipe joint comprising a ring for holding said gasket at the joint and against the inner pipe, a plurality of clamping plates arranged on the face of said holding ring and having arcuate flanges at their inner ends forming a substantially continuous ring surrounding the inner pipe adapted to pass between said holding ring and the inner pipe to press said gasket against the joint, said holding ring and clamping plates having aligned apertures, washers abutting on said ring and on a shoulder on the outer pipe and bolts extending through said washers and the aligned apertures in said holding ring and clamping plates.

13. A repair device for applying a gasket to a telescoping pipe joint comprising a ring for holding said gasket at the joint and against the inner pipe, a plurality of clamping plates arranged on the face of said holding ring and having arcuate flanges at their inner ends forming a substantially continuous ring surrounding the inner pipe adapted to pass between said holding ring and the inner pipe to press said gasket against the joint, said holding ring and clamping plates having aligned apertures, washers abutting on said ring and on a shoulder on the outer pipe, bolts extending through said washers and the aligned apertures in said holding ring and clamping plates, and a wedge formed on each of said washers and adapted to engage the face of the outer pipe.

14. A coupling for a pipe joint comprising a split ring encircling the pipe, a sealing gasket confined between said ring and the pipe, a metallic packing ring bearing on said gasket, a segmental clamping ring bearing on said split ring and on substantially the entire periphery of said packing ring and bolts extending through the segments of said clamping ring and adapted to force the latter against said packing ring.

15. A repair device for applying a rubber gasket to a telescoping pipe joint comprising a ring adapted to hold said rubber gasket against the face of the outer of the telescoping pipes and in contact with the wall of the inner pipe, packing rings interposed between said holding ring and the inner pipe and the face of the outer pipe, and means for securing the assembly in sealing relation at the joint.

16. A repair device for applying a rubber gasket to a telescoping pipe joint comprising a ring adapted to press said rubber gasket against the face of the outer of the telescoping pipes and in contact with the wall of the inner pipe, packing rings interposed between said holding ring and the inner pipe and the face of the outer pipe, and means for securing the assembly in sealing relation at the joint.

FRED C. ARMBRUSTER.